United States Patent [19]

Nakajima

[11] Patent Number: 4,633,044
[45] Date of Patent: Dec. 30, 1986

[54] TELEPHONE HANDSET COMPRISING AN ADAPTER RESILIENTLY FIXED FOR A TRANSMITTER OR A RECEIVER TO A HOUSING THEREFOR

[75] Inventor: Suemitsu Nakajima, Kawasaki, Japan
[73] Assignee: Nitsuko, Ltd., Kawasaki, Japan
[21] Appl. No.: 682,279
[22] Filed: Dec. 17, 1984

[30] Foreign Application Priority Data

Jan. 12, 1984 [JP] Japan ............................... 59-1739[U]
Jan. 12, 1984 [JP] Japan ............................... 59-1740[U]

[51] Int. Cl.⁴ ......................... H04M 1/03; H04M 1/04
[52] U.S. Cl. .................................... 379/433; 381/159
[58] Field of Search ........... 179/103, 178, 179, 182 R, 179/121 R, 182 A, 146 R

[56] References Cited

U.S. PATENT DOCUMENTS 2,720,332 10/1955 Holt ..................................... 179/103
4,163,875 8/1979 Cogan ................................. 179/103
4,319,095 3/1982 Cogan ................................. 179/103
4,456,794 6/1984 Strömer et al. ..................... 179/103

Primary Examiner—Gene Z. Rubinson
Assistant Examiner—Danita R. Byrd
Attorney, Agent, or Firm—Hopgood, Calimafde, Kalil, Blaustein & Judlowe

[57] ABSTRACT

A cup-shaped adapter for use in a telephone handset in receiving each of a transmitter and a receiver and in connecting a pair of conductors of a handset cord to the transmitter or receiver, comprises a boss radially extended from a peripheral surface of the adapter and a pair of arms which are approximately radially extended from the peripheral wall away from the boss and comprise outwardly directed pins. A lower housing case of the handset comprises a boss supporting member and a pair of pin supporting members which have holes and between which the arms are resiliently interposed with the pins received in the respective holes. Preferably, the boss supporting member has a central hole for receiving the boss. Alternatively, the boss supporting member comprise a pair of resilient projections which define a central opening for receiving the boss.

6 Claims, 6 Drawing Figures

1

TELEPHONE HANDSET COMPRISING AN ADAPTER RESILIENTLY FIXED FOR A TRANSMITTER OR A RECEIVER TO A HOUSING THEREFOR

BACKGROUND OF THE INVENTION

This invention relates to a telephone handset comprising an adapter which receives a transmitter or a receiver of the handset and which is connected to a pair of conductors of a handset cord.

In the manner which will later be described more in detail, the adapter is mechanically fixed by a machine screw to a housing of the handset in a conventional telephone handset of the type described. The housing must therefore comprise a main body, a bar rendered integral with the main body for fixation of the adapters thereto by the machine screws, and a transmitter and a receiver cover which are mechanically fixed to the main body so as to regidly hold the transmitter and the receiver in place in cooperation with the bar, the machine screws, and the transmitter and the receiver covers. The handset must comprise in this manner a considerable number of parts. It is troublesome to assemble the parts into a handset. Furthermore, at least one of the transmitter and the receiver is apt to be loosely held in the housing because it has been inevitable that either or all of the machine screws and the transmitter and the receiver covers become loose during long use of the handset. In other words, the handset has had a poor reliability.

SUMMARY OF THE INVENTION

It is therefore an object of the present invention to provide a telephone handset comprising an adapter, which handset has a high reliability.

It is another object of this invention to provide a telephone handset of the type described, which comprises a reduced number of parts.

It is still another object of this invention to provide a telephone handset of the type described, which is readily assembled.

Other objects of this invention will become clear as the description proceeds.

According to this invention, there is provided a telephone handset comprising a housing having a pair of side walls and a pair of longitudinal ends for housing a transmitter and a receiver adjacent the longitudinal ends, respectively, and a cup-shaped adapter for receiving each of the transmitter and the receiver in contact therewith, the adapter having a peripheral wall around a center axis, wherein the housing comprises a boss supporting member at one of the longitudinal ends and a pair of pin supporting members adjacent the respective side walls and spaced from said boss supporting member so as to receive one of the adapters for the transmitter and the receiver between the boss supporting member and the pin supporting members, each pin supporting member having a hole formed therethrough, the above-mentioned one of the adapters comprising a boss extended from the peripheral wall away from the center axis and further comprising a pair of arms which extend from the peripheral wall in the opposite direction from the boss on both sides of a central line passing through the boss and the center axis, the arms being capable of resilient interposition between the pin supporting members, each arms comprising a pin near a free end thereof, the pins of the respective arms being directed away from each other, the boss being supported by the boss supporting member, the pins being received in the holes of the respective pin supporting members.

DESCRIPTION OF THE PREFERRED EMBODIMENTS

Figure 1:
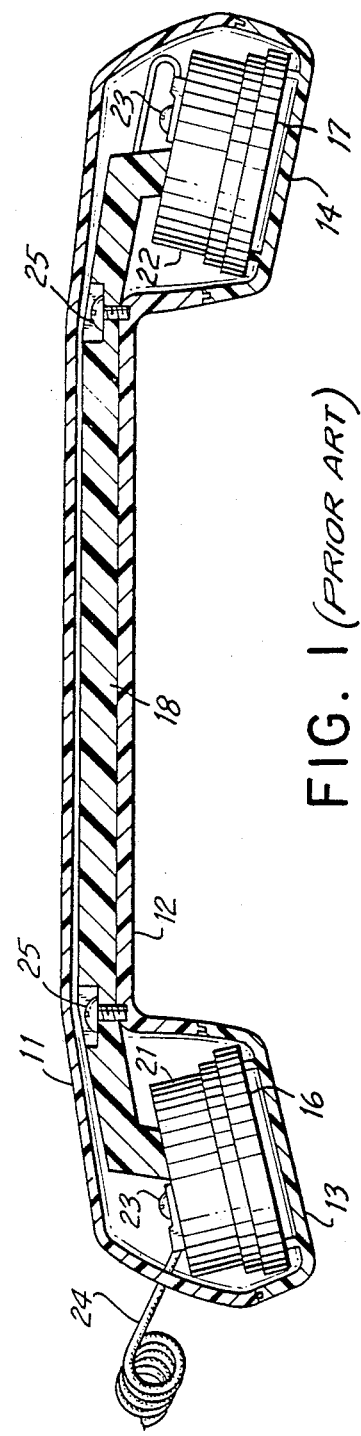
FIG. 1 is a longitudinal sectional view of conventional telephone handset.

Referring to FIG. 1, a conventional telephone handset will be described at first in order to facilitate an understanding of the present invention. The handset comprises a housing which comprises, in turn, an upper case 11, a lower case 12, a transmitter cover 13, and a receiver cover 14, all made of acrylonitrile-butadiene-styrene resin know as ABS resin in the art. The lower case 12 has a pair of side walls, a pair of longitudinal ends, a transmitter and a receiver opening near the respective longitudinal ends, and a pair of reference planes adjacent to the transmitter and the receiver openings, respectively. Each of the transmitter and the receiver openings has a threaded periphery. Each of the transmitter and the receiver covers 13 and 14 has a threaded peripheral end for engagement with the threaded periphery of the transmitter or the receiver opening. Either of the upper and the lower cases 11 and 12 has a peripheral rib which can be fixedly received in a peripheral groove of the other of the cases 11 and 12 to provide a unitary main body of the housing. It is possible to understand that the side walls, the longitudinal ends, and the reference planes are had either by the housing or the main body.

In the manner which will be presently be described, a transmitter 16 and a receiver 17 of the handset are housed in the housing adjacently of the respective longitudinal ends and parallel to the respective reference planes. A longitudinal bar 18 is rendered integral with the housing and extends near to the transmitter 16 and the receiver 17. Each of first and second adapters 21 and 22 is cup-shaped. More particularly, each adapter 21 or 22 comprises a circular cylindrical peripheral wall around a center axis and a bottom wall which has an inside and an outside surface directed inwardly and outwardly of the center axis of the adapter 21 or 22. A pair of electrical terminals (not shown) is attached to the inside surface. A pair of machine screws, indicated at 23, is accessible from the outside of the adapter 21 or 22 and is for mechanically and electrically connecting a pair of conductors of a handset cord 24 to the terminals. The adapters 21 and 2 are held in position with the bar 18 fixed to the lower case 12 by other machine screws 25.

The transmitter 16 and the receiver 17 are placed in the first and the second adapters 21 and 22, respectively, in mechanical and electrical contact with the electrical terminals. Thereafter, the transmitter and the receiver covers 13 and 14 are screwed to the lower case 12. The transmitter 16 and the receiver 17 are rigidly held in the housing. The adapters 21 and 22 are in mechanical and electrical contact with the transmitter 16 and the receiver 17 in this manner.

In the manner described above, the handset comprises a considerable number of parts. It is troublesome to assemble the parts into a conventional telephone handset. Moreover, either or both of the transmitter 16 and the receiver 17 are apt to become loosely held in the housing. This is because it has been unavoidable that one or all of the machine screws 25 for the bar 18 and the transmitter and the receiver covers 13 and 14 are liable to become loose during long use of the handset.

Figure 2A:
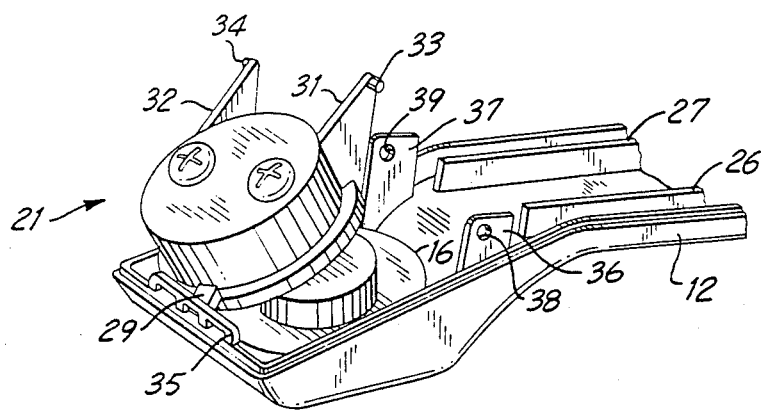
FIGS. 2 (A) and (B) are partial perspective views of a telephone handset according to a first embodiment of the instant invention and FIG. 2 (C) is a partial longitudinal sectional view of the handset, FIGS. 2 (A) through (C) being for use in describing the steps of manufacture.
Figure 2B:
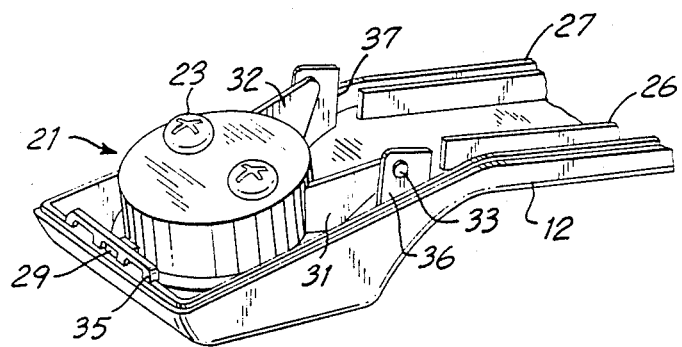
Figure 2C:
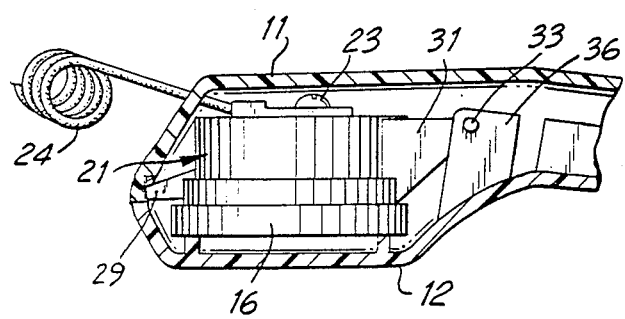

Referring now to FIGS. 2 (A) through (C), a telephone handset according to a first embodiment of this invention comprises similar parts designated by like reference numerals. That part of the handset is not illustrated merely for simplicity of illustration which comprises the receiver 17 (FIG. 1). In other words, that remaining part alone is illustrated which comprises the transmitter 16. The upper case 11 (FIG. 1) is removed. Two reinforcing ribs 26 and 27 are collectively a unitary portion of the lower case 12 of the housing and are extended parallel to the side walls of the lower case 12 near to the respective longitudinal ends of the housing.

Each of the first adapter 21 and the second adapter 22 (FIG. 1) comprises a boss 29 extended from the circular cylindrical peripheral wall away from the center axis of the peripheral wall. For convenience of the description which follows, a central line will be defined for the adapter 21 or 22. The central line passes through the central axis and the boss 29 and becomes substantially parallel to the side walls when the handset is assembled in the manner which will shortly be described. Preferably, the boss 29 extends from a periphery which surrounds an opening of each adapter 21 or 22. As depicted, a flange may be rendered integral with each adapter 21 or 22. The boss 29 has preferably a substantially triangular longitudinal section parallel to the central line and a substantially rectangular cross-section perpendicularly thereof. A pair of arms 31 and 32 is extended from the peripheral wall in a direction away from the boss 29 on both sides of the central line as will later be discussed more in detail. Each arm 31 or 32 has an outwardly directed surface. The arms 31 and 32 comprise pins 33 and 34, respectively. The pins 33 and 34 are positioned near free ends of the respective arms 31 and 32 and are outwardly directed from each other. It is possible to manufacture such an adapter 21 or 22 together with the boss 29, the arms 31 and 32, and the pins 33 and 34 of the acrylonitrile-butadiene-styrene resin as an integral body by resorting to molding. At least one of the arms 31 and 32 should be resilient. It is possible to attain a desired resiliency by making the arm 31 or 32 have a thickness of about 2.5 mm when the arm 31 or 32 has a length of about 18 mm from the peripheral wall to the pin 33 or 34.

The lower case 12 comprises a boss supporting member 35 at each of the longitudinal ends and a pair of pin supporting members 36 and 37 adjacent the respective side walls and spaced from the boss supporting member 35. Each pin supporting member 36 or 37 has an inwardly directed surface. As will also be discussed in detail in the following, the boss and the pin supporting members 35 through 37 should be spaced so as to receive the pertinent one of the first and the second adapters 21 and 22 therebetween. The pin supporting members 36 and 37 are spaced apart from each other so as to resiliently receive therebetween the arms 31 and 32 with the pins 33 and 34. The pin supporting members 36 and 37 have holes 38 and 39 for receiving the pins 33 and 34, respectively. Each of the holes 38 and 39 is formed through the pin supporting member 36 or 37 near a free end thereof. Together with the holes 38 and 39, the boss and the pin supporting members 35 through 37 are manufactured of the acrylonitrile-butadiene-styrene resin as an integral part of the lower case 12. As will become clear from the following description, it is possible to mold the lower case 12 and the transmitter and the receiver covers 13 and 14 as an entirety of the acrylonitrile-butadiene-styrene resin rather than individually manufacturing them as separate parts with threads and subsequently assembling the separate parts into the handset.

In the manner depicted in FIG. 2 (A), the transmitter 16 and the receiver 17 (FIG. 1) are placed in position on the unitary structure of the lower case 12 and the transmitter and the receiver covers 13 and 14. The first adapter 21 is mounted on the transmitter 16 by fixing the boss 29 to the boss supporting member 35 as will later be described in detail. The pins 33 and 34 are over the respective pin supporting members 36 and 37. It is to be noted that the pin supporting members 36 and 37 do not much protrude from the peripheral rib of the lower case 12. The adapter 21 is therefore approximately parallel at this instant to the above-mentioned reference plane for the transmitter 16 although the adapter 21 is depicted with an exaggerated angle relative to the reference plane.

As shown in FIG. 2 (B), the arms 31 and 32 are resiliently interposed between the pin supporting members 36 and 37. The adapter 21 is pushed towards the transmitter 16 until the pins 33 and 34 are received in the respective holes 38 and 39. The arms 31 and 32 are preferably in face to face contact with the respective pin supporting members 36 and 37. It is desirable to provide a tapered portion on that side of each pin 33 or 34 which comes first in contact with the free end of the pin supporting member 36 or 37.

As shown in FIG. 2 (C), the conventional handset cord 24 is assembled with two conductors (not shown) being attached to the first adapter 21 by the machine screws 23, in a known manner. After the second adapter 22 (FIG. 1) is likewise dealt with in a known manner, the upper case 11 (FIG. 1) is put into engagement with the lower case 12 to which the transmitter 16, the receiver 17, the adapters 21 and 22, and the handset cord 24 are already assembled. The handset is ready for the inspection step of manufacture.

It should now be understood that the number of parts is unexpectedly reduced as compared with the number which has been mandatory in a conventional telephone handset. The steps of manufacture are also astonishingly reduced. The adapter 21 or 22 is rigidly held by the boss and the pin supporting members 35 though 37. The transmitter 16 and the receiver 17 are also fixedly placed in position. Although not shown, a key and a keyway may be used as a part of the lower case 12 and in the transmitter 16 or the receiver 17 for use in orienting the same for mechanical and electrical contact with the electrical terminals of the adapter 21 or 22. Alternatively, it is possible to remove the problem of orientation of the transmitter 16 and the receiver 17 by forming the electrical terminals, one at the center of the bottom wall and the other concentrically around the center terminal. Inasmuch as the machine screws 25 for the longitudinal bar 18 are not used, the handset is very reliable and has a long life. The reliability is enhanced by the unitary structure of the lower case 12 and the transmitter and the receiver covers 13 and 14.

The above-described outwardly directed surfaces of the respective arms 31 and 32 should preferably be on two equal sides of an isosceles triangle which has a vertex at the boss 29. When the inwardly directed surfaces of the respective pin supporting members 36 and 37 are in face to face contact with the respective outwardly directed surfaces, it is possible to readily design a mold for the lower housing 12 comprising the pin supporting members 36 and 37 with the holes 38 and 39.

It is possible to understand that the above-described isosceles triangle has a base between those points or interfaces of the outwardly directed surfaces from which the respective pins 33 and 34 are outwardly extended. It has been confirmed that either of the first and the second adapters 21 and 22 is reliably stably held by the boss and the pin supporting members 35 through 37 when the isosceles triangle has a height to base ratio which is roughly about 2:1. Typically, the height is about 110 mm. The base has a length of about 45 mm. It is readily possible by calculation based in such numerical values to design another mold for the adapter 21 or 22 comprising the boss 29, the arms 31 and 32, and the pins 33 and 34.

The outwardly directed surfaces of the respective arms 31 and 32 may be brought into contact with the respective inwardly directed surfaces of the pin supporting members 36 and 37 along a pair of lines. In this instant, the above-mentioned isosceles triangle has a base between the lines of contact. The above-described numerical values are equally well applicable.

Referring more particularly to FIGS. 2 (A) through (C), a telephone handset according to a modification of the handset illustrated with reference thereto comprises a boss supporting member 35 which, in turn, comprises a beam fixed to one of the longitudinal ends of the lower case 12 by four studs to define a central hole and two side holes on both sides of the central hole. The central hole is positioned centrally between the side wall of the lower case 12 and substantally rectangular so as to receive the boss 29 of the pertinent one of the first and the second adapter 21 and 22. It is possible to manufacture the lower case 12 comprising the beam and the studs by molding.

On putting the adapter 21 or 22 in place, the boss 29 is put into the central hole in the manner illustrated in FIG. 2 (A). Subsequently, the adapter 21 or 22 is pushed towards the transmitter 16 or the receiver 17 and at the same time approximately parallel to the reference plane towards the longitudinal ends. The adapter 21 or 22 is easily correctly positioned as shown in FIG. 2 (B).

Figure 3A:
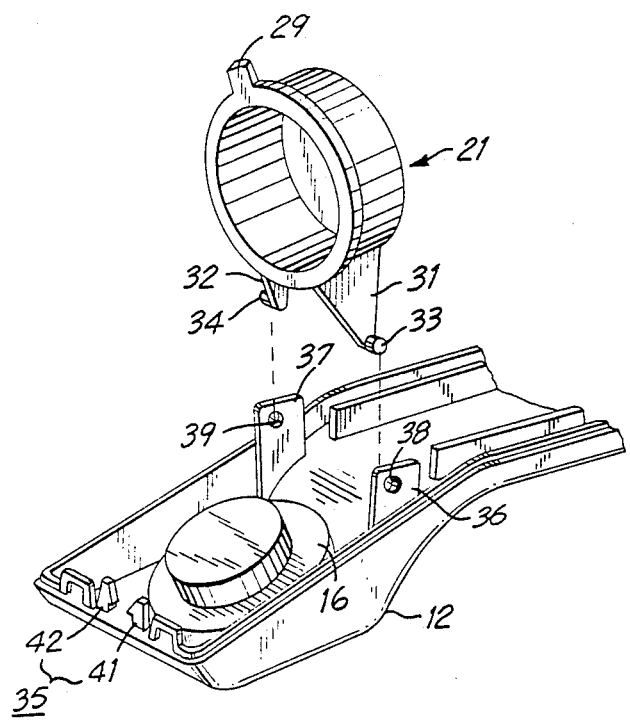
FIGS. 3 (A) and (B) are an exploded partial perspective view and a frgamentary perspective view of a telephone handset according to a second embodiment of this invention and are for use in describing the steps of manufacture.
Figure 3B:
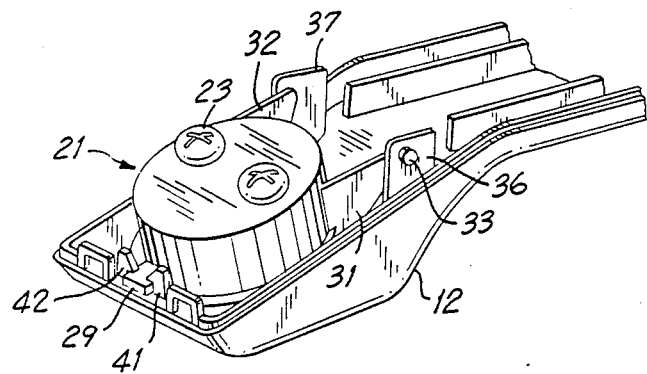

Referring to FIGS. 3 (A) and (B), a telephone handset according to a second embodiment of this invention comprises similar parts which are again designated by like reference numerals. As best seen from FIG. 3 (A), the boss supporting member 35 comprises a pair of projections 41 and 42 perpendicularly of the above-mentioned reference plane for the pertinent one of the tranmsitter 16 and the receiver 17 (FIG. 1) and symmetrically on both sides of a longitudinal center line of the lower case 12. The projections 41 and 42 have free end portions, respectively, and comprise inwardly protruded ears at the respective free end portions. In cooperation with those neck portions of the respective projections 41 and 42 which are between the peripheral rib of the lower case 12 and the respective ears, the ears define a central opening for receiving the boss 29 of the adapter 21 or 22. The projections 41 and 42 should be resilient as will presently become clear. On both sides of the central opening, two side holes are defined as in FIGS. 2 (A) through (C) by a pair of beams rendered integral with the lower case 12 by four studs. The side holes are for receiving a pair of boss (not shown) inwardly protruded from the adjacent longitudinal end of the upper case 11 (FIG. 1). It is possible to manufacture by molding the lower case 12 comprising the projections 41 and 42 with ears and the beams with studs by using the acrylonitrile-butadiene-styrene resin.

In the manner shown in FIGS. 3 (A), the arms 31 and 32 of the adapter 21 or 22 are resiliently interposed between the pin supporting members 36 and 37 and pushed down until the pins 33 and 34 are received in the respective holes 38 and 39 of the pin supporting members 36 and 37. Thereafter, the adapter 21 or 22 is rotated towards the transmitter 16 or the receiver 17 (FIG. 1) with the pins 33 and 34 used collectively as an axle. The boss 29 is thus positioned first above and adjacent the projections 41 and 42.

As shown in FIG. 3 (B), the boss 29 has now been forced downwards until the boss 29 is received in the central opening between projections 41 and 42. It has been comfirmed that the transmitter 16 or the receiver 17 is reliably held by the adapter 21 or 22. In the manner discribed before, two pairs of conductors of the handset cord 24 (FIG. 1) are fixed to the first and the second adapters 21 and 22, respectively. The handset is now ready for the inspection step.

In order that the projections 41 and 42 be resilient, the neck portion of each projection 41 or 42 should preferably have a width of about 2 mm in the plane of the central opening. Each ear should be inwardly projected about 0.5 mm.

While this invention has thus far been described with reference to two embodiments thereof and a few modifications, it will now readily be possible for one skilled in the art to carry this invention into effect in various other manners. Above all, a telephone handset may comprise only one combination of the adapter 21 or 22 with the boss 29 and others and a lower case 12 with the boss supporting member 35 and so forth. In this event, the other of the adapters 21 and 22 may either be conventional or one described in conjunction with the other of FIGS. 2 (A) through (C) and FIGS. 3 (A) and (B).

What is claimed is:

1. In a telephone handset comprising a housing having a pair of side walls and a pair of longitudinal ends for housing a transmitter and a receiver adjacent said longitudinal ends, respectively, and a cup-shaped adapter for receiving each of said transmitter and said receiver in contact therewith, said adapter having a peripheral wall around a center axis, the improvement wherein:

said housing comprises a boss supporting member at one of said longitudinal ends and a pair of pin supporting members adjacent the respective side walls and spaced from said boss supporting member so as to receive one of the adapters for said tranmitter and said receiver between said boss supporting member and said pin supporting members, each pin supporting member having a hole formed therethrough;

said one of the adapters comprising a boss extended from said peripheral wall away from said center axis and further comprising a pair of arms which extend from said peripheral wall in the opposite direction from said boss on both sides of a central line passing through said boss and said center axis, each arm comprising a pin near a free end thereof, the pins of the respective arms being directed away from each other, said boss being supported by said boss supporting member, and said arms being interposed between said pin supporting members with said pins being received in said holes of the respective pin supporting members.

2. A telephone handset as claimed in claim 1, wherein at least one of said arms is resilient.

3. A telephone handset as claimed in claim 2, wherein said at least one of the arms is of acrylonitrile-butadiene-styrene resin and has a length of about 18 mm between said peripheral wall and the pin thereof and a thickness of about 2.5 mm.

4. A telephone handset as claimed in claim 2, said boss having a substantially triangular longitudinal section parallel to said central line and a substantially rectangular cross-section perpendicularly of said central line, wherein said boss supporting member has a rectangular hole centrally between said side walls.

5. A telephone handset as claimed in claim 2, said housing having means defining a reference plane parallel to one of said transmitter and said receiver, said one of the transmitter and the receiver being received in said one of the adapters, wherein said boss supporting member comprises a pair of resilient projections extending perpendicularly of said reference plane, said projections having free end portions, respectively, and comprising inwardly projected ears at the respective free end portions to define a substantially rectangular space for receiving the boss of said one of the adapters.

6. A telephone handset as claimed in claim 5, wherein each projection is of acrylonitrile-butadiene-styrene resin and has a width of about 2 mm, each ear being inwardly projected about 0.5 mm.

* * * * *